UNITED STATES PATENT OFFICE.

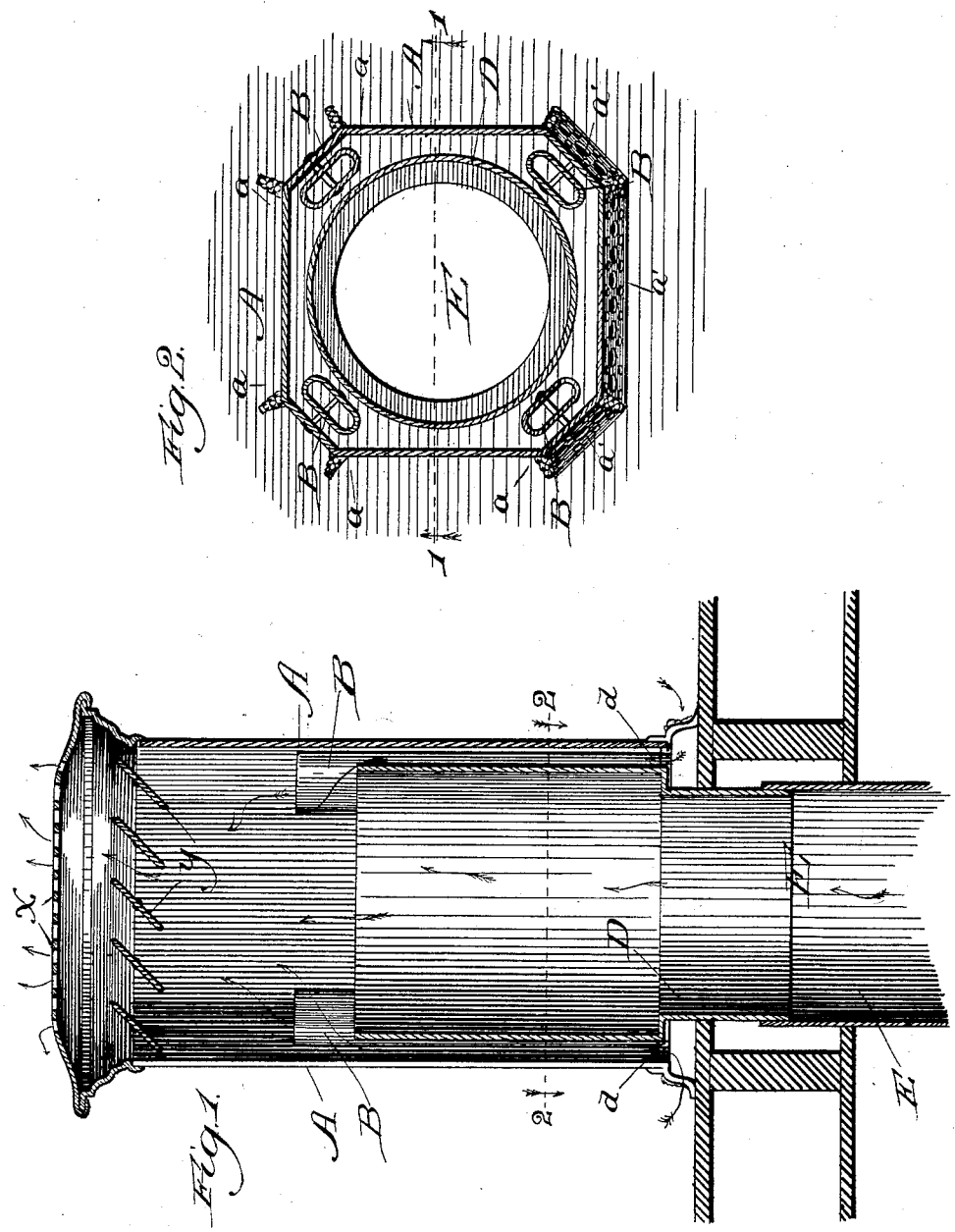

GEORGE H. HESS, OF CHICAGO, ILLINOIS.

HOT-AIR EQUALIZING-REGISTER.

SPECIFICATION forming part of Letters Patent No. 346,102, dated July 27, 1886.

Application filed January 30, 1886. Serial No. 190,268. (No model.)

*To all whom it may concern:*

Be it known that I, GEORGE H. HESS, a citizen of the United States, residing at Chicago, in the county of Cook and State of Illinois, have invented certain new and useful Improvements in a Hot-Air Equalizing-Register, of which the following is a full description, sufficient to enable those skilled in the art to understand and construct the same.

The object of my invention is to cause the air in a room wherein my equalizing-register is placed to become thoroughly and uniformly heated by the furnace supplying hot air, from the action of the hot air admitted through my equalizing-register and the currents generated thereby in the room, and this, too, in a manner independent of the proper ventilation of the room.

I have illustrated my invention by the drawings accompanying this specification and forming a part hereof.

Figure 1 is an elevation on line 1 1 of Fig. 2. Fig. 2 is a plan view on line 2 2 of Fig. 1.

Like letters refer to like parts throughout the several views.

A is a metal drum resting upon legs $a$ $a$. Perforated metal $a'$ $a'$ may be placed between legs $a$ $a$, to serve as a screen for the prevention of dirt or dust getting underneath drum A, if desired. Legs $a$ $a$, perforated metal screen $a'$ $a'$, may be cast in one piece, and, as well, drum A, when preferred.

D is a cylinder.

E is the flue or cylinder from the furnace.

X is a perforated top placed on drum A.

Y Y are fly-valves.

Cylinder D extends at its lower end below the drum or cylinder A, and fits into the cylinder E from the furnace. Flues B extend from about the lower end of cylinder A to about or some distance above the top of cylinder D, and are open at both ends.

In case the cylinder A, perforated metal $a'$, and legs $a$ $a$ are cast in one piece, as hereinbefore mentioned, the word "bottom" is intended to indicate that part of cylinder A just above the perforations $a'$.

I have illustrated a flue, B, as placed at each corner of drum A; but it is evident that any number of flues may be placed between cylinder D and drum A, and in case this space is entirely filled with cylinders B B it may be preferable to construct drum A in the form of a cylinder, and if this be done the spaces intervening between said flues B B, and between said flues and cylinders A and D, may be closed by a plate, as indicated by dotted lines $d$ $d$, and the height of cylinder D may then be materially diminished, and even cut off at said dotted lines $d$ $d$.

In the form of construction illustrated in Figs. 1 and 2, and in which form of construction the space between cylinder D and drum A is left open at the bottom for the admission of air in said space, it is necessary to allow cylinder D to extend a sufficent distance above the lower end of drum A to heat the air between said cylinder D and drum A, so as to cause an upward current therein before the heated air in cylinder D is discharged into drum A, and thereby allowed to mix with said air between the cylinder and the drum or the upward current therefrom. The heating of the flues B B by the air discharged from flue or cylinder E in cylinder D causes an upward current of air in said flues B B. A movement toward my equalizing-register of the air in the room, and upon the bottom thereof, is thus caused by the action of the heated air from the furnace whenever valves Y Y, if valves are used, are open for the passage of air through the equalizing-register. By the closing of the valves Y all upward currents through my equalizing-register are stopped, and the only heated air from the furnace admitted into the room passes downward in flues B B, or between cylinder D and drum A and cylinder B, and is discharged from underneath said drum A. I find in practice that the amount of air thus discharged is very limited, and no further or other cut-off of heated air from the furnace is ever required than that afforded by these valves, and even these valves may be dispensed with and the amount of hot air discharged from my equalizing-register determined and regulated at the furnace or at some point between said register and the furnace.

Having thus described my invention, what I claim is—

1. In a hot-air equalizing-register, drum A, having a perforated top and valves at the upper end thereof and legs or supports at the lower end thereof, whereby it is raised from the floor, in combination with cylinder D, extending upward into said drum A, but not to the top thereof, and downward into furnace-flue E, substantially as described.

2. In a hot-air equalizing-register, drum A, having a perforated top and valves at the upper end thereof and legs or supports at the lower end thereof, whereby it is raised from the floor, in combination with flues open at each end thereof, extending from the lower end of said drum upward into the same, with cylinder D, extending downward into furnace-flue E and upward into drum A, the said flues and cylinder D not extending to the top of drum A, all substantially as described.

3. In a hot-air equalizing-register, the combination of drum A, perforated top X, cylinder D, flues B B, and legs $a$ $a$, having perforated metal $a'$ $a'$ between them, all substantially as described.

GEO. H. HESS.

Witnesses:
 CARLETON WHITE, Jr.,
 E. A. METHOFF.